June 10, 1958 R. J. S. BROWN 2,838,732
FLEXIBLE COIL FOR WELL LOGGING
Filed Oct. 24, 1955

INVENTOR
ROBERT J. S. BROWN
BY
ATTORNEYS

United States Patent Office 2,838,732
Patented June 10, 1958

2,838,732
FLEXIBLE COIL FOR WELL LOGGING

Robert J. S. Brown, Fullerton, Calif., assignor to California Research Corporation, San Francisco, Calif., a corporation of Delaware Application October 24, 1955, Serial No. 542,411

7 Claims. (Cl. 324—10)

My invention relates to improvements in methods and apparatus for establishing a magnetic field in earth formations traversed by a borehole and more particularly for nuclear magnetic induction logging of wells to distinguish between oil and water in earth formations.

This application is a continuation-in-part of my application Serial No. 462,429, filed October 15, 1954, now abandoned, entitled "Logging Method and Apparatus."

Nuclear magnetic well logging involves impressing on the liquid in the formation a temporary magnetic field at an angle to the magnetic field of the earth whereby the nuclei of the atoms in the liquid are aligned with the impressed field. When the impressed field is shut off abruptly, an alternating current signal may be detected in a coil adjacent the liquid at the characteristic precessional frequency exhibited by the nuclei of the atoms in the liquid. This alternating current signal dies out over a period of time which depends on the material in which the nuclei are found and on certain ambient conditions. This interval of time is called the relaxation time of the nuclei. Since experimentation has shown that the relaxation times differ for water and oil, the nuclear magnetic induction method of well logging has been proposed to distinguish water and oil in the formations traversed by the well.

While in the laboratory the measurement of relaxation time can be made with a sample placed within a coil and hence a strong uniform field can be impressed on the sample, unfortunately this position relationship of the coil to the liquid in the formation cannot readily be obtained in a well. Although it is desirable that the field be strong and relatively uniform over as much of the formation to be tested as possible, coils capable of providing a strong polarization have inductance with consequent long decay time for current in their windings. However, in a coil of such characteristics it is difficult to extinguish the current rapidly for purposes of measuring the relaxation time of the nuclei.

According to my invention, the strength and penetration of a magnetic field induced in the formation are maximized by disposing the windings of a flexible coil into close engagement with the walls of the well bore. In a preferred form of apparatus for carrying out my invention, the flexible coil windings are forced into contact with the formation by springs. The windings are thus held in engagement with the formation during both the alignment of nuclei by the induced magnetic field and the subsequent measurement of the relaxation time of the nuclei after decay of the induced magnetic field. By said preferred form of apparatus, said coil may have a small inductance for a given current and polarization, so that rapid decay of the induced magnetic field is obtained and the switching problem greatly simplified. Additionally, by the present invention, the measured signal-to-noise ratio during the decay period for the nuclei within the formation is greatly increased by virtue of the greater effectiveness of the induced magnetic field. The coil is in an arcuate shape subtending an angle selected to increase the fraction of the energy of the coil which is in the most penetrating mode. Energy of the field in the most penetrating mode decreases with the square of the distance from the coil. In my coil, the most penetrating mode is the dominant mode because most of the energy of the coil is in this mode. For a given polarizing field energy, the field strength is proportional to the square of the radius of the coil. Thus, the field strength is greatly increased by maximizing this radius, or urging the windings into intimate contact with the walls of the well bore. The available signal power from a given element of polarization, after current flow has terminated in the coil, likewise varies in accordance with the square of the radius of the coil. Thus, with both the field inducing and measuring coils being urged into intimate engagement with the formation, the measured signal power is increased in accordance with the fourth power for the same polarizing energy.

The novel features of my invention are set forth with more particularity in the accompanying claims. The invention itself, however, with respect to the details thereof, together with its additional objects and advantages, may be better understood from the following description of specific embodiments with reference to the accompanying drawings, in which:

Figure 1:
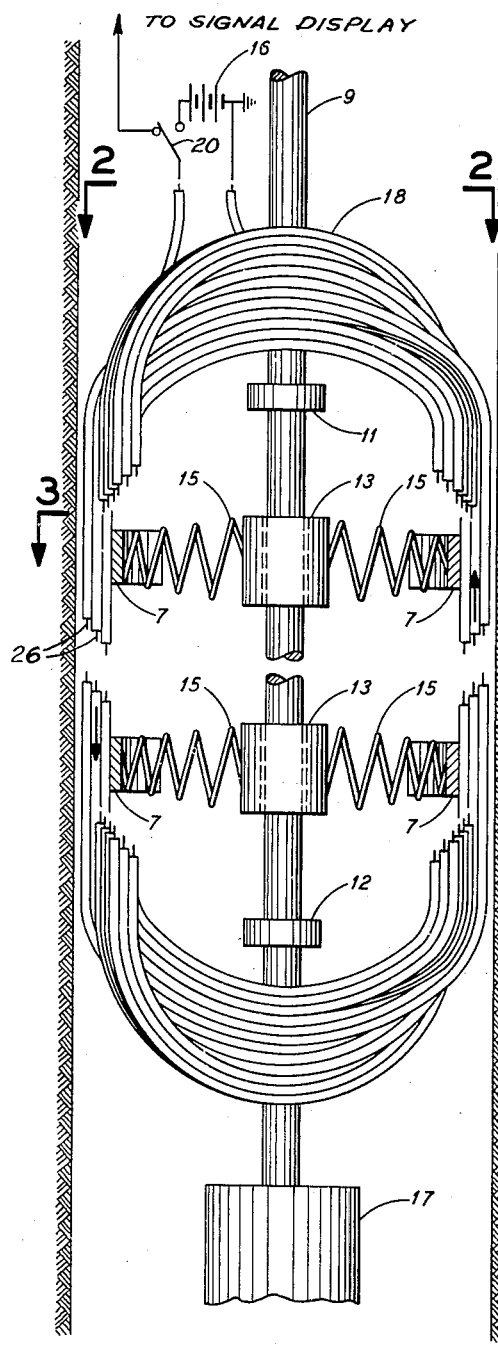
Fig. 1 is a schematic diagram of a coil according to my invention.
Figure 2:
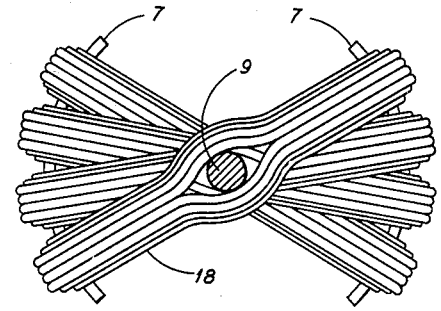
Fig. 2 is a cross-section through the supporting member for the coil and a top view of the coil, taken in the direction of arrows 2—2 in Fig. 1.
Figure 3:
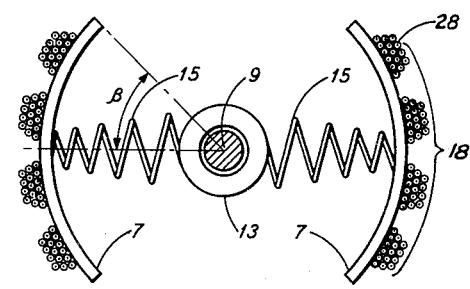
Fig. 3 is a cross-section through the windings of the coil, in the direction of arrows 3—3 in Fig. 1.

As shown in Fig. 1, the logging sonde comprises an elongated coil having a generally ellipsoidal outer surface. The insulated conductors 26 forming the individual windings of the coil are grouped in a number of smaller bundles 28 made up of said insulated conductors. As shown in Figs. 2 and 3, the insulated outer surface of the coil is arcuate, and the coils rest on arcuate, non-magnetic members 7. Through the major axis of the coil passes a supporting rod 9 having a pair of lugs 11 and 12 and bases 13 for coil springs 15. The lugs 11 and 12 provide an upwardly facing shoulder and a downwardly facing shoulder respectively and are so arranged on the rod 9 that when the rod 9 is pulled upwardly, the shoulder provided by the upper lug 11 presses against the coil, elongating the coil and pulling it upward. When the upward force on the rod 9 is reduced, a weight 17 pulls the rod 9 down into the well, and the shoulder provided by the lower lug 12 presses against the coil, elongating it and pulling it further into the well. Thus, when the coil is being moved either upward or downward, its diameter is decreased whenever an obstruction is encountered in order that it may more easily pass obstructions in the well bore. The springs 15 press against the arcuate members 7 to press the coils against the bore of the well. All parts of the coil assembly are made of non-magnetic material in order to prevent distortions of the magnetic field of the coil.

A high current source, such as battery 16 made be employed to provide current to the coil 18 through disconnect switch 20. The current through the elongated sides of the coil flows downward on one side and upward in the other. As shown in the drawing, curent flow is downward on the left side and in the opposite direction on the right side. The two sides of the coil, which are against the walls of the well, are then essentially two adjacent conductors carrying current in opposite directions so that for this reason the vertical parts of the coil on opposite sides of the well bore repel each other according to the laws of electrodynamics and force the windings of the coil tightly against the walls of the well. For this reason, the springs 15 may be omitted altogether or may be used solely to press the coil form 7 against the bundles 28 of coil 18. Where the springs 15 are omitted altogether, or are relatively weak, the coil 18 is not pressed against the sides of the bore as the coil is moved into position. Thus, as the coil is moved within the bore of the well, it has a small diameter which facilitates easy raising and lowering of the coil. On the other hand, it is important that the coil be pressed tightly against the walls of the well while an electromagnetic field is being established within the formation adjacent the well. At this time, current flowing through the coil gives rise to a repelling effect between the vertical segments of the coil forcing them tightly against the walls of the well and maximizing the field which is set up in the formation. Thus, current flow through the coil is used to position the coil for optimum operation at precisely the time when such positioning is critical. The coil is flexible enough to elongate appreciably at the time when it is being lowered in the well.

I have found that it is desirable that the windings of the coil be in contact with the sides of the well bore. Half of the field energy of the coil is within the coil and the other half of the field energy established by the coil is outside the coil. In order that the field energy within the formation around the well bore be maximized, the coil is pressed against the sides of the well so that a complete half of the field energy of the coil is within the formation. My coil, as shown in Figs. 2 and 3, is therefore circumferentially distributed about a radius concentric with the major axis of its ellipsoidal form so that opposite halves of the turns of said coil can rest against the diametrically opposed sides of the bore. The half-angle beta shown in Fig. 3 subtended by the arcuate portions of the windings of my coil governs to some extent the penetration of the flux from the coil. If the angle, beta, is 45 degrees, over 90 percent of the flux from the coil is applied radially outwardly from the arcuate surface of the coil so that said flux is in the most penetrating mode to the formation and fluids surrounding the coil windings. For an angle, beta, of 15 degrees, less than 75 percent of the flux is in the most penetrating mode. For an angle of 60 degrees, more than 99 percent of the signal of the flux is in the most penetrating mode. For an angle, beta, of 90 degrees, the relationship is the same as that for an angle of 45 degrees. Thus, I have established the limits for the angle, beta, as being from approximately 15 degrees to 90 degrees, 90 degrees being the largest possible angle. For applications in which less penetration or less uniform field is needed, an angle of less than 15 degrees may be satisfactory. For general use, however, more than 75 percent of the energy of the coil should be in the most penetrating mode. I prefer to employ an angle, beta, of 45 degrees, since a coil having such an angle could decrease to one-half its original diameter in order to pass a constriction in the well bore. It will be noted that the windings of the coil are shown as consisting of several small bundles of windings 28. This arrangement permits flexibility so that, if the member 7 is flexible or is hinged to permit it to collapse, the bundles of the windings may compress independently and thus be more flexible and occupy a smaller space. The portion of the windings across the top and bottom portions of the coil are sufficiently flexible to permit the diameter of the coil to change appreciably.

The use of a coil shaped to provide maximum penetration and maximum field extends the usefulness of the logging sonde for nuclear magnetic logging. Because of the increased efficiency of the coil, less power is required to establish a satisfactory field. The reduction in the power requirement simplifies the switching problem at the contacts of switch 20. For nuclear magnetic logging purposes, the flux in the coil must be collapsed rapidly, i. e., in a time short compared to Larmor period. My coil is so arranged that a relatively small amount of current and a relatively low impedance coil may be employed with a corresponding decrease in the back voltage at shutoff and a decrease in the arcing at the contacts of switch 20 when current to the coil is interrupted.

While I have described my invention with respect to a specific embodiment, certain modifications and changes thereof will be apparent to one skilled in the art. I do not intend, therefore, to limit my invention, except as set forth in the appended claims.

I claim:

1. Well logging apparatus for establishing a magnetic field in an earth formation traversed by a well bore comprising a polarizing coil having an ellipsoidal form, means for supporting said coil in a well bore, said polarizing coil including a plurality of elongated turns, each of the elongated portions of said turns being radially displaced from and substantially parallel to the major axis of said ellipsoidal form with said elongated portions circumferentially distributed in said ellipsoidal form so that the opposite sides of each of said turns can be brought into firm engagement with the diametrically opposed sections of the walls of the well bore and the surrounding earth formation, means for radially expanding said turns of said coil toward the walls of said well bore, and means for controlling the passage of electrical current through said coil while said turns are radially expanded to increase the strength of the magnetic field within the surrounding earth formation.

2. Apparatus in accordance with claim 1 in which said means for radially expanding said turns of said coil includes spring means between said support means and said coil turns.

3. Apparatus in accordance with claim 1 in which said means for radially expanding said turns of said coil includes a power source for passing an electrical current therethrough.

4. Nuclear magnetic well logging apparatus comprising a polarizing coil having a plurality of insulated turns formed as the outer surface of an ellipsoid and adapted to be positioned with its major axis parallel to the axis of a well bore, each of said turns being circumferentially spaced about a radius normal to said major axis to permit contact with the diametrically opposed portions of the walls of the well bore, a polarizing current source, means for connecting said source to said coil to cause at least some of said plurality of turns to expand relative to adjacent turns and in a radially outward direction with respect to said major axis to bring said coil turns into firm engagement with the walls of said well bore.

5. Well logging apparatus for establishing a magnetic field in an earth formation traversed by a well bore comprising a polarizing coil adapted to traverse the well bore, means for supporting said polarizing coil in said well bore, said polarizing coil having a plurality of elongated turns adapted to be brought into firm engagement with the walls of said well bore and the surrounding earth formation, means for radially expanding said turns of said coil, means for controllably passing an electrical current through said coil while said turns are radially expanded to increase the strength of the magnetic field within the earth formation, and means for interrupting said current flow to reduce the friction between said coil and said well bore walls.

6. Apparatus for establishing a nuclear magnetic field in an earth formation traversed by a well bore comprising a flexible electromagnetic field coil, a cable for supporting said field coil in said well bore, said coil having a plurality of elongated windings circumferentially distributed about a radius normal to the direction of the axis of elongation of said turns, said cable being substantially concentric with said axis and slidable in an axial direction relative to said windings, a pair of axially spaced apart shoulders on said cable, each of said shoulders lying within said coil, one of said shoulders being disposed adjacent one end of said coil and the other of said shoulders being disposed adjacent the other end of said coil so that one of said shoulders presses against the upper portion of said coil when said cable is raised and said other shoulder presses against the lower portion of said coil when said cable is lowered, and resilient means for urging the opposite sides of the windings of said coil outwardly in a direction radial to said cable and the elongation axis of said coil.

7. Apparatus for establishing a magnetic polarizing field in and around a well bore traversing an earth formation comprising a plurality of continuously connected turns of an electrically insulated conductor formed about the surface of an elongated cylinder, said turns being parallel to the axis of revolution of said cylinder, with the halves of each turn being on the diametrically opposite side of said cylinder, said turns being circumferentially distributed around said surface of revolution and subtending an angle of arc between about 30 and 120 degrees, to form a coil, means for supporting said coil in a well bore, means for urging the opposite sides of said coil radially outward from the axis of said cylinder, means for passing an electrical current through said conductor to magnetically polarize the earth formation and well bore surrounding said coil, and means for opening and closing the circuit of said coil.

References Cited in the file of this patent

UNITED STATES PATENTS

| | | |
|---|---|---|
| 2,712,629 | Doll | July 5, 1955 |
| 2,712,630 | Doll | July 5, 1955 |
| 2,716,730 | Williams | Aug. 30, 1955 |
| 2,750,557 | Doll | June 12, 1956 |
| 2,770,773 | Cooley | Nov. 13, 1956 |